United States Patent [19]

MacPhail

[11] Patent Number: 5,706,454
[45] Date of Patent: Jan. 6, 1998

[54] CHANGEABLE LIVE ICON WITH VISUAL STATE INDICATOR OPTION

[75] Inventor: Margaret Gardner MacPhail, Austin, Tex.

[73] Assignee: International Business Machines Corporation, Armonk, N.J.

[21] Appl. No.: 429,399

[22] Filed: Apr. 26, 1995

[51] Int. Cl.$^6$ .................................................. G06F 3/00
[52] U.S. Cl. .................................................. 395/348
[58] Field of Search .................................. 395/155–161, 395/326–358; 345/117–120, 146, 902

[56] References Cited

U.S. PATENT DOCUMENTS

| | | | |
|---|---|---|---|
| 4,914,568 | 4/1990 | Kodosky et al. | 395/159 X |
| 5,050,104 | 9/1991 | Heyen et al. | 395/161 X |
| 5,182,796 | 1/1993 | Shibayama et al. | 395/156 |
| 5,202,961 | 4/1993 | Mills et al. | 395/159 |
| 5,235,679 | 8/1993 | Yoshizawa et al. | 395/156 |
| 5,261,044 | 11/1993 | Dev et al. | 395/159 |
| 5,276,801 | 1/1994 | Heyen et al. | 395/159 X |
| 5,276,816 | 1/1994 | Cavendish et al. | 395/159 X |
| 5,301,270 | 4/1994 | Steinberg et al. | 395/161 |
| 5,301,336 | 4/1994 | Kodosky et al. | 395/161 X |
| 5,367,626 | 11/1994 | Morioka et al. | 395/159 |
| 5,388,203 | 2/1995 | Kaneko | 395/159 |
| 5,471,399 | 11/1995 | Tanaka et al. | 395/161 X |
| 5,506,952 | 4/1996 | Choy et al. | 395/159 |

FOREIGN PATENT DOCUMENTS

| | | |
|---|---|---|
| 0 468 911 A2 | 1/1992 | European Pat. Off. |
| 0 473 524 A2 | 3/1992 | European Pat. Off. |
| 0 540 925 A1 | 5/1993 | European Pat. Off. |

OTHER PUBLICATIONS

IBM Technical Disclosure Bulletin, "Icon Variations Represent Properties of an Object", vol. 33, No. 5, Oct. 1990, pp. 323–325.

IBM Technical Disclosure Bulletin, "Interactive Help Function", vol. 31, No. 4, Sep. 1988, pp. 481–483.

*Primary Examiner*—John E. Breene
*Attorney, Agent, or Firm*—Diana L. Roberts; Richard A. Henkler; Andrew J. Dillon

[57] ABSTRACT

A uniquely programmed computer system, computer-implemented method, and computer readable memory embodying computer-readable detail logic direct a computer system to provide viewing and adjustment of the default state (i.e., operation) of a desktop icon. The default state is performed when the desktop icon is dropped on a target icon. Therefore, if the default state is "copy", then the selected object icon is automatically copied to the target object icon when the selected icon is dropped on the target icon. The computer-implemented method includes the steps of determining if a visual state indicator option is "ON" and, if so, drawing the desktop icon(s) on the display in such a manner as to indicate to the user/viewer the default state of the icon.

18 Claims, 3 Drawing Sheets

5,706,454

CHANGEABLE LIVE ICON WITH VISUAL STATE INDICATOR OPTION

BACKGROUND OF THE INVENTION

1. Field of the Invention

The present invention relates to improvements in desktop computing environments, and more particularly, but without limitation, to a system, method, and memory for viewing and adjusting the default state of a desktop icon.

2. Background Information and Description of the Related Art

A user easily communicates to a computer system's operating system via a "graphical user interface" (GUI). A desktop is a GUI that utilizes a desktop metaphor to view and manipulate system objects. The desktop includes at least one workspace (i.e., work surface) to store, manipulate and view system objects, such as data files, controls, applications, (e.g., text editors, databases, file manages, and games) and devices. The desktop represents those system objects as icons in the workspace. An icon is a visual representation of an entity that can be manipulated (e.g., selected, dragged, dropped). The desktop ensures that the icons are redrawn when the desktop or part of the desktop is refreshed. The desktop also detects and delivers system objects, icon selections, drags, and drops to the correct application.

Users interact with desktop icons by dragging and dropping a selected icon onto a target icon. In a large percentage of these operations, the selected icon is either copied, moved or linked to the target icon. Therefore, conventional desktops often have a default operation, such as copy. Occasionally, the user can determine what the default operation is by examining the context. For example, the context of dragging an icon over a trash can icon obviously indicates a "move". Most often, however, the operation associated with dragging a selected icon to a target icon is ambiguous. Therefore, a user may not know what operation will be performed if he/she drags a document icon over a folder icon. Therefore, there is a great demand for a desktop that visually indicates which operation will be performed if the user initiates a drag/drop operation. It would also be advantageous for the desktop to easily allow the user to change the default operation of all and/or specific icons.

SUMMARY

Accordingly, a uniquely programmed computer system, computer-implemented method, and computer readable memory embodying computer-readable detail logic direct a computer system to provide viewing and adjustment of the default state (i.e., operation) of a desktop icon. The default state is performed when the desktop icon is dropped on a target icon. Therefore, if the default state is "copy", then the selected object icon is automatically copied to the target object icon when the selected icon is dropped on the target icon.

The computer-implemented method includes the steps of determining if a visual state indicator option is "ON" and, if so, drawing the desktop icon(s) on the display in such a manner as to indicate to the user/viewer the default state of the icon.

Therefore, it is an object of the present invention to provide a desktop that allows a user to view and change the default state of a desktop icon.

It is a further object to provide a desktop that draws all icons having a visual representation of the icon's state.

These and other objects, advantages, and features will become even more apparent in light of the following drawings and detailed description.

DETAILED DESCRIPTION OF THE PREFERRED EMBODIMENT

The preferred embodiment includes a computer-implemented method, a uniquely programmed computer system, and a memory embodying detailed logic for directing a computer system to display and provide adjustment of the default state of a desktop icon.

Figure 1:
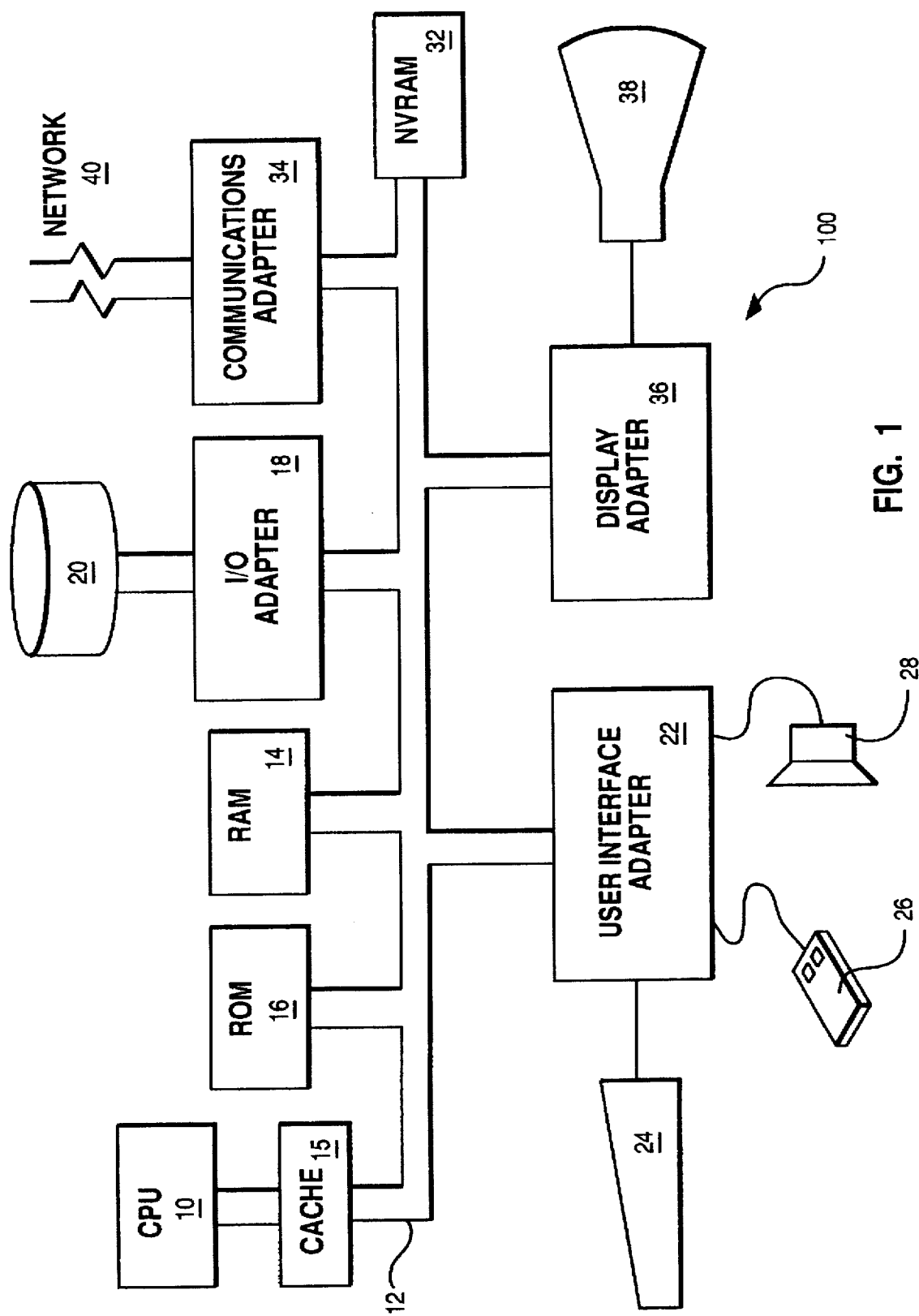
FIG. 1 illustrates a schematic diagram of a computer system for use with the present invention.

The present invention is practice in a laptop computer or, alternatively, in the computer system illustrated in FIG. 1. Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, or Apple's System 7™ control CPU 10 from RAM 14. Accordingly, the desktop executes from RAM 14. However, in the preferred embodiment, an IBM RISC System/6000™ runs the AIX™ operating system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 2:
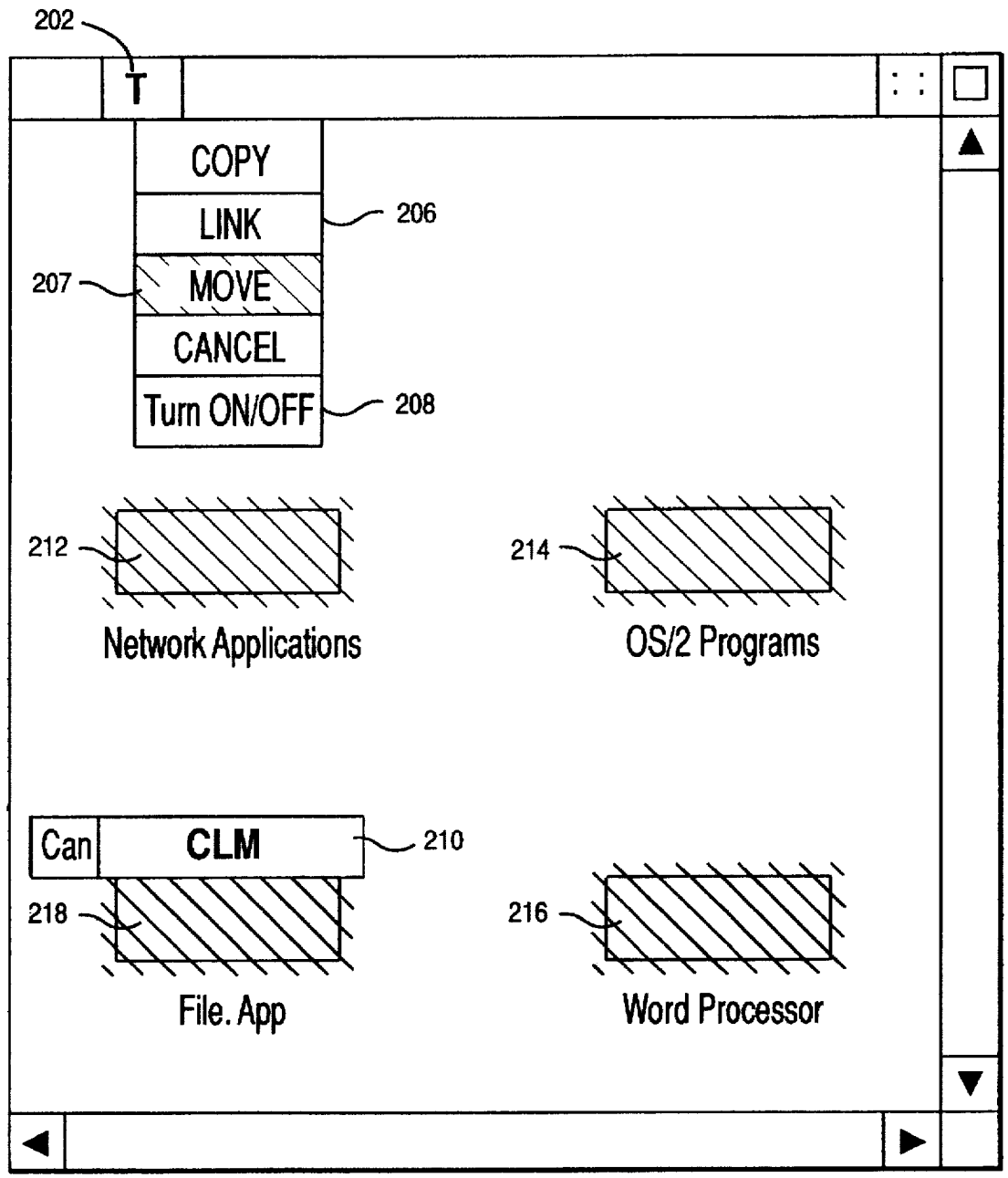
FIG. 2 illustrates a frontal display diagram of the desktop in accordance with the present invention.

Referring to FIG. 2, the preferred embodiment includes a desktop enhancement (DT) for displaying front panel container 200 on display 38. For ease and explanation, the following description describes the DT as performing unique functions and features. In actuality, the DT merely directs CPU 10 to perform those functions and features.

Front panel container 200 is a two-dimensional workspace for displaying icons 212, 214, 218 and 216. The diagonal hatching marks on icons 212, 210, 214, and 216 indicate that the default state/operation for these icons is "move." Therefore, if the user drags and drops file.app icon 218 on word processor icon 216, that file will be moved into the word processor object. In the preferred embodiment, hatching marks in the opposite direction (not shown) indicate a link state/operation. Furthermore, double hatching marks (not shown) indicate a copy state. Alternatively, any type of visual indicators could be employed to distinguish between states, such as color or sound.

To change the default state of all icons, the user uses pointing device 26 to select T control button 202. Selecting icons using a pointing device is well known in the computer art and need not be further described. In response, the desktop displays drop-down menu 206. As illustrated, the "move" state/operation is the current state for all icons. The user may change the default state by clicking on either the copy or link option in menu 206. However, the user may desire to completely turn off (or on) the visual state indicator (e.g. hatching marks). To do this, the user selects the "turn off/on" toggle option in menu 206 to turn off (or on) the visual state indicator.

The user may desire to individually change the state of specific icons, while leaving other icons in the default state. To do this, in the preferred embodiment, the user double-clicks over the desired icon. In this example, the user has double-clicked over icon 218, resulting in the DT displaying horizontal bar 210. The user may then select "C" for copy or "L" for link by clicking over the respective visual letter indicator. Alternatively, one skilled in the art readily recognizes that various other operations and states could be employed.

If the user selects "L" for link, then the default state for icon 218 would change from "move" to "link" and the hatching marks would be redrawn in the opposite direction. Therefore, if the user drags and drops icon 218 on OS/2 programs icon 214, the DT links those two object icons. Accordingly, the user may change the state of all icons or, alternatively, may selectively change the state of one or more particular icons.

Figure 3:
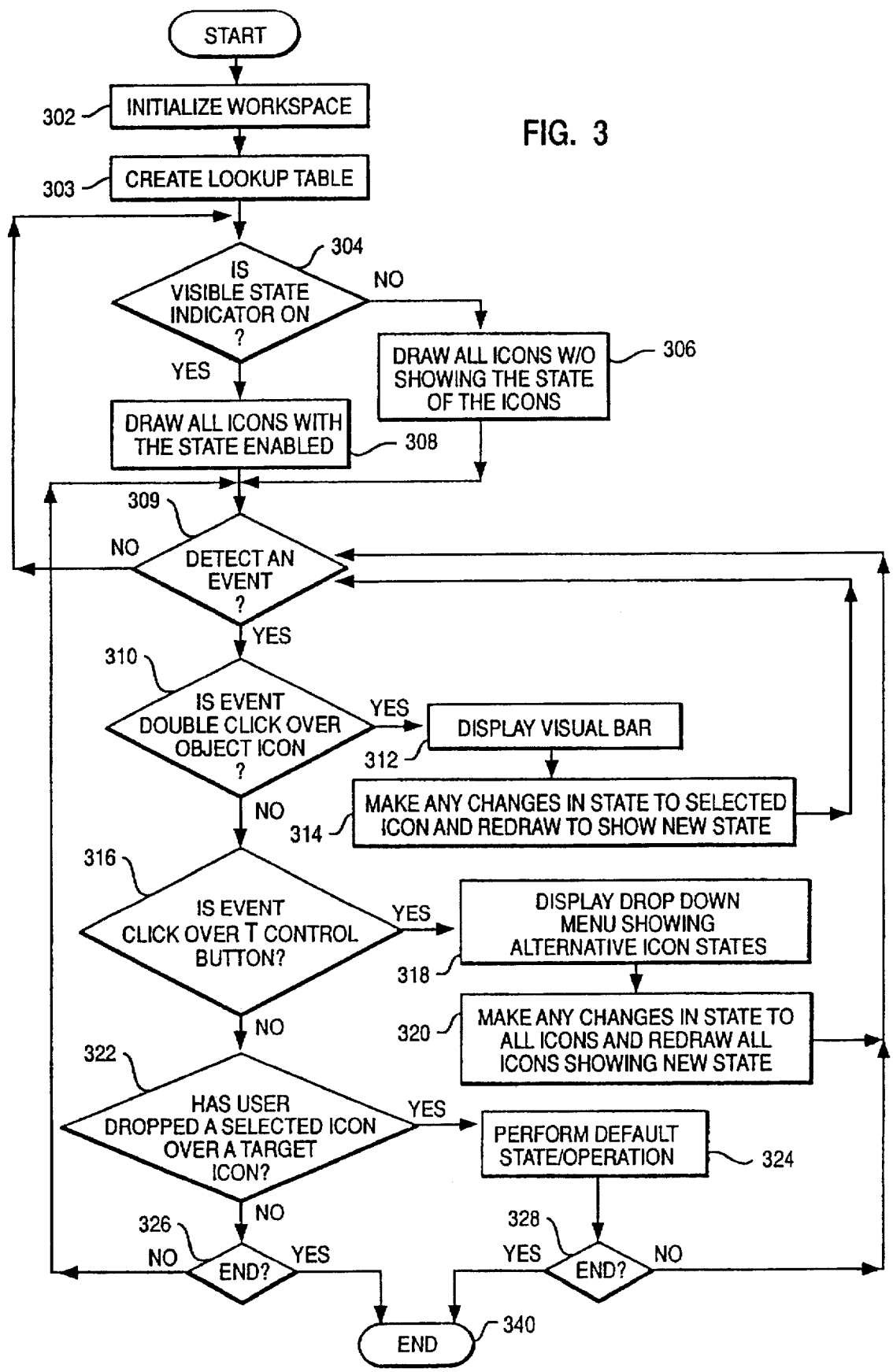
FIG. 3 illustrates a flowchart of detailed logic according to the present invention.

The flow of execution of the preferred embodiment is as follows:

FIG. 3 illustrates detailed logic for implementing the preferred embodiment. At 302, the initialization process of the desktop workspace begins. To do this, the DT loads from one drive of disk drives 20 a container resource file (not shown) into RAM 14. The container resource file contains the default arrangement and descriptive information of the objects present in container 200. Descriptive information includes the image (e.g., icon) representing the object, the location of the image within container 200, the command(s) necessary to open the object when selected, and the command(s) executed when a user drops an object on another object. Several conventional desktops utilize container resource files and, therefore, they are well known in the computer arts. The DT parses the container resource file into system-recognizable data.

At 303, the DT allocates space in RAM 14, creates a lookup table in that allocated space for retaining data structures, and populates that lookup table with the parsed data from the container resource file. The lookup table dynamically maintains the screen coordinates for both the objects contained within container 200 and container 200 itself. Accordingly, the DT retrieves from hard disk 20 any settings saved from the previous session and populates the lookup table with those settings. The DT also creates any front panel widgets and controls for container 200 using the newly populated lookup table.

At 304, the DT examines a binary "visual state indicator" field within the lookup table to determine if the visible state indicator is enabled (i.e. ON). If not enabled, at 306, the DT draws all icons in container 200 without showing the state of the object icons. If the visual state indicator is enabled, at 308, the DT examines a state field for each icon within the lookup table, determines the default state of each icon from the state field, and draws all icons within container 200 with the visual state indicator enabled. As previously described, the DT draws the icons with left, right, or dual hatching marks, where appropriate. At 309, the DT waits for an event (e.g., a click from user controls over an icon) from an event queue (not shown) in RAM 14. The DT determines and dispatches the coordinates of the event to an event loop executing in RAM 14. The DT then examines the screen coordinates of the event to determine if the event occurred on a particular icon.

At 310, the DT determines if a single or double click occurred over an object icon in container 200 using a conventional software timer. If the event was a double click over an icon, at 312, the DT displays slider bar 210. At 314, the DT waits for a click by the user over one of the options in slider bar 210, makes changes (if any) in state (e.g., move, link, copy) to the selected icon in the lookup table, and redraws the selected icon to show the new state, if any.

Returning to 310, if the event was not a double click over an object icon, at 316, the DT determines if a single click occurred over T control button 202 in container 200. If so, at 318, the DT displays drop-down menu 206 showing the current state for all icons (if any) in hatching marks (see 207 in FIG. 2) and alternative icon states. Also, drop-down menu 206 provides the user with turn off option 208 to completely turn off the visual state indicator. At 320, the DT makes any changes to the state of the icons and redraws all icons showing the new state, if any.

Returning to 316, if the event was not a single click over T control button 202, at 322, the DT determines if the user hah dropped a selected icon over a target icon in container 200. If so, at 324, the DT performs the default state operation on the selected and target object icons.

At 326, the DT determines if the user desires to quit. If so, control is directed to 340. If not, control returns to 309.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A computer-implemented method for directing a computer system to display a state of at least one icon on a display, the state being performed when the icon is dropped on a target icon, comprising the steps of:

examining a location in memory to determine if a visual state indicator option is on; and if the visual state indicator option is on, drawing the icon on the display to indicate the state of the icon.

2. The computer-implemented method according to claim 1 wherein the step of determining if a visual state indicator option is on comprises the following steps:

examining a binary visual indicator field within a lookup table in memory; and if the binary visual indicator field is set, determining that the visual indicator option is on.

3. The computer-implemented method according to claim 1 wherein the step of drawing the icon on the display to indicate the state of the icon comprises the following steps:

if the state is move, drawing hatching marks over the icon in a first direction;

if the state is link, drawing hatching marks over the icon in a second direction; and if the state is copy, drawing hatching marks over the icon in a third direction.

4. The computer-implemented method according to claim 1 further comprising the step of:

if the visual state indicator option is on, drawing a plurality of icons on the display to indicate the state of the icons.

5. The computer-implemented method according to claim 4 further comprising the step of:

in response to a first command from user controls to change the state of the plurality of icons, displaying a menu of alternative states;

in response to a second command from user controls, changing the state for the icons; and redrawing the plurality of icons on the display to indicate a new state of the icons.

6. The computer-implemented method according to claim 1 further comprising the step of:

in response to a first command from user controls to change the state of the icon, displaying a menu of alternative states;

in response to a second command from user controls, changing the state of the icon; and redrawing the icon on the display to indicate a new state of the icon, thereby indicating what operation will be performed by the computer system if the icon is dropped on another icon.

7. The computer-implemented method according to claim 6 wherein the first command comprises a double click from a mouse over the icon.

8. The computer-implemented method according to claim 7 wherein the second command comprises a single click from a mouse over one of the alternative states in the menu.

9. The computer-implemented method according to claim 6 wherein the step of changing the state of the icon comprises the following step:

changing a state field within a lookup table.

10. A computer system having at least a processor, memory, user controls, and display, for displaying a state of at least one icon on the display, the state being performed when the icon is dropped on a target icon, comprising:

the processor for examining a memory location to determine if a visual state indicator option is on; and if the visual state indicator option is on, the processor for drawing the icon on the display to indicate the state of the icon.

11. The computer system according to claim 10 further comprising:

the processor for examining a binary visual indicator field within a lookup table; and if the binary visual indicator field is set, the processor determines that the visual indicator option is on.

12. The computer system according to claim 10 further comprising:

the processor for drawing hatching marks over the icon in a first direction if the state is move;

the processor for drawing hatching marks over the icon in a second direction if the state is link; and the processor for drawing hatching marks over the icon in a third direction if the state is copy.

13. The computer system according to claim 10 further comprising:

if the visual state indicator option is on, the processor for drawing a plurality of icons on the display to indicate the state of each icon.

14. The computer system according to claim 13 further comprising:

in response to a first command from the user controls to change the state of the plurality of icons, displaying a menu of alternative states;

in response to a second command from the user controls, changing the state for the icons; and redrawing the plurality of icons on the display to indicate a new state of the icons.

15. The computer system according to claim 10 further comprising:

in response to a first command from the user controls to change the state of the icon, displaying a menu of alternative states on the display;

in response to a second command from user controls, changing the state of the icon; and redrawing the icon on the display to indicate a new state of the icon.

16. The computer system according to claim 15 wherein the first command comprises a double click from a mouse over the icon.

17. The computer system according to claim 16 wherein the second command comprises a single click from a mouse over one of the alternative states in the menu.

18. The computer system according to claim 15 wherein the processor changes the state of the icon by changing a state field for the icon within a lookup table, the lookup table stored in memory.

* * * * *

UNITED STATES PATENT AND TRADEMARK OFFICE
CERTIFICATE OF CORRECTION

PATENT NO. : 5,706,454
DATED : January 6, 1998
INVENTOR(S) : MacPhail

It is certified that error appears in the above-identified patent and that said Letters Patent is hereby corrected as shown below:

Column 4, line 26: change "hah" to --has--

Signed and Sealed this

Second Day of June, 1998

Attest:

BRUCE LEHMAN

Attesting Officer     Commissioner of Patents and Trademarks